US008334961B2

(12) United States Patent
Montbach et al.

(10) Patent No.: US 8,334,961 B2
(45) Date of Patent: Dec. 18, 2012

(54) ELECTROOPTICAL DISPLAY WITH ELECTRICAL CROSSOVER

(75) Inventors: Erica N. Montbach, Kent, OH (US); Mark Lightfoot, Sterling, OH (US); Todd C. Ernst, Tallmadge, OH (US)

(73) Assignee: Kent Displays Incorporated, Kent, OH (US)

( * ) Notice: Subject to any disclaimer, the term of this patent is extended or adjusted under 35 U.S.C. 154(b) by 577 days.

(21) Appl. No.: 12/557,074

(22) Filed: Sep. 10, 2009

(65) Prior Publication Data

US 2010/0059273 A1 Mar. 11, 2010

Related U.S. Application Data

(60) Provisional application No. 61/191,591, filed on Sep. 10, 2008.

(51) Int. Cl.
*G02F 1/1345* (2006.01)
(52) U.S. Cl. ........ 349/149; 349/150; 349/151; 349/152; 349/153; 345/87; 345/104; 257/72; 439/709
(58) Field of Classification Search ................ 349/149, 349/150–153, 155; 345/67, 104
See application file for complete search history.

(56) References Cited

U.S. PATENT DOCUMENTS

| 6,720,944 | B1 * | 4/2004 | Ishii et al. ........................ 345/87 |
| 7,170,481 | B2 * | 1/2007 | Doane et al. ..................... 345/87 |
| 7,236,151 | B2 * | 6/2007 | Doane et al. ..................... 345/87 |
| 2006/0103802 | A1 * | 5/2006 | Miki et al. ........................ 349/153 |
| 2007/0013856 | A1 * | 1/2007 | Watanabe et al. ............. 349/150 |
| 2009/0115942 | A1 * | 5/2009 | Watanabe ....................... 349/96 |

OTHER PUBLICATIONS

Woznicki, Tom, "Hot-Bar Soldering," Flex Circuit News, Nov. 2000, pp. 1-7.

* cited by examiner

*Primary Examiner* — Edward Glick
*Assistant Examiner* — Sang Nguyen
(74) *Attorney, Agent, or Firm* — Pearne & Gordon LLP

(57) ABSTRACT

Electrooptical displays require conductors on both sides of the liquid crystal thin film. The two conductors face opposite sides of the display. The cost of electrically connecting to these displays can be decreased by having the conductors of the display all face the same side of the display. This invention includes a technique to allow both conductors to face the same side of the display.

29 Claims, 7 Drawing Sheets

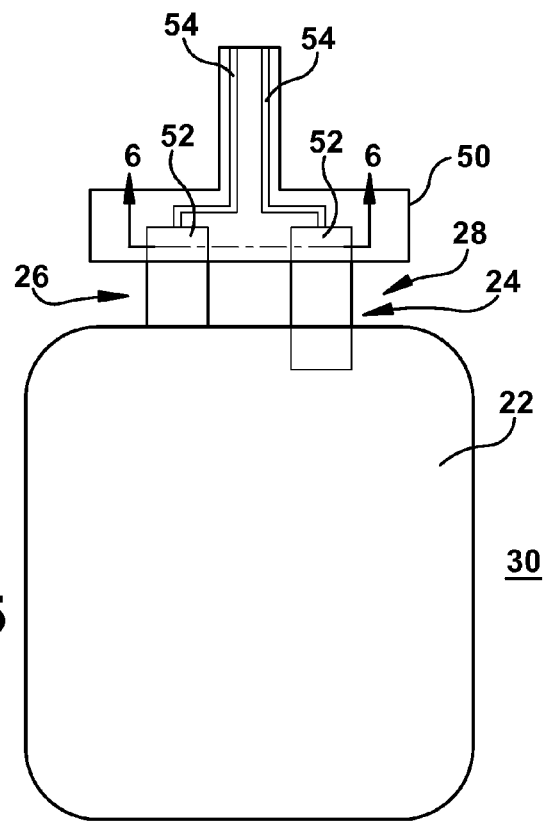
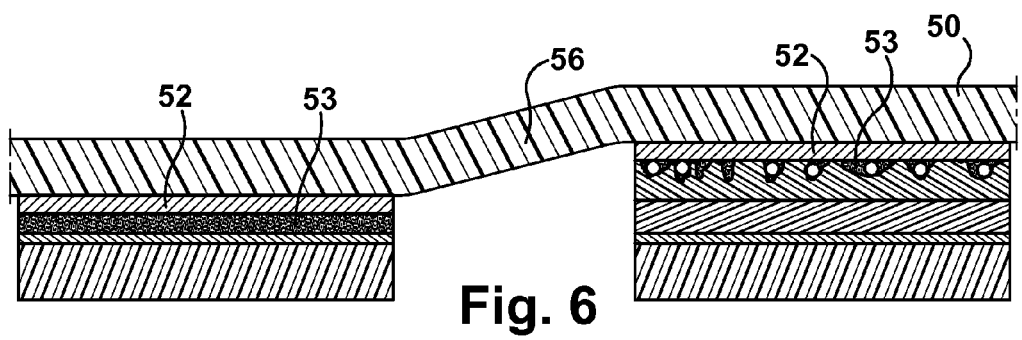

ELECTROOPTICAL DISPLAY WITH ELECTRICAL CROSSOVER

RELATED APPLICATION

This application claims the benefit of U.S. provisional application Ser. No. 61/191,591.

FIELD OF THE INVENTION

The invention is in the field of electrooptical displays and ways in which the displays are designed to enable interconnection by display electronics to electrically conductive layers of the display.

BACKGROUND

Liquid crystal display (LCD) modules are becoming more and more highly used in everyday life and work. To create images on LCD screens the LCD must be electrically connected to the display electronics to create a completed module. There are several typical techniques for electrically interconnecting the LCD and electronics, including; chip on glass (COG), where the display driver chip is physically bonded to the display's electrical traces on the display substrate. Another technique is to physically bond the display substrate to a flexible polyimide material, called a flex, which has embedded copper traces and pads. If the flex technique is used then the remaining unbounded end of the flex must be connected to a PCB or TAB that contains the display driver chip. An interconnect technique must be used for each of the display substrates, resulting in two bonding steps and two sets of driver chips for each display. It is possible to electrically connect one substrate's leads to the other substrate's leads (referred to as indium-tin oxide (ITO) traces, but can also be other transparent conductors such as conducting polymer, carbon nanotubes or others), which is referred to as an electrical cross-over. This is particularly useful when there are a smaller amount of total ITO traces for the LCD and then only one substrate requires physical bonding to either the COG or the flex. An electrical cross-over allows for a reduction of interconnect steps and materials used and thus, represents a cost reduction.

A common technique to electrically cross-over an LCD containing glue gasket around the perimeter is to place conductive spheres, or spacers, in that gasket. Therefore, the conductive spheres are held in one location in the display. In this situation ITO traces from both substrates touch the conductive spheres, allowing for an electrical connection between traces on both the substrates. This technique requires that the LCD uses a gasket around the perimeter.

Instead of electrically crossing-over one can also use one piece of flex to connect to both substrates. In this case the flex must have vias in it to allow connection to all traces on either the top or bottom side of the flex. Vias are in a simplistic sense a hole drilled in the polyimide that is then filled with copper, such that the copper filled hole has copper traces on both sides of the flex that come into contact with the via. This technique allows the display driver chips to be located on a PCB and requires fewer driver chips, thus reducing cost. However, a flex containing vias is typically very expensive.

To use as few display driver chips and interconnect processes for the least possible cost on a display that does not use a gasket around the perimeter a new type of electrical crossover is required.

TECHNICAL DISCLOSURE

We disclose a technique of electrically switching a plastic display by electrically connecting to only one plastic substrate. The electrical display comprises one or two substrates with conductive layers facing one another that are held apart by a liquid crystal layer. This invention allows a simple interconnect solution that is easy to assemble to the display and economical. Typical interconnect solutions require electrically connecting the flex to both of the display substrates.

In general, the invention features an electrooptical display with electrical cross-over. A substrate has a display area of overlapping conductive layers, a cross-over region designated for electrical cross-over and a bonding area for bonding display electronics to the conductive layers. A first conductive layer of electrically conductive material is disposed on the substrate in the display area and in the bonding area. An electrical cross-over member is disposed in the bonding area and in the cross-over region and comprises a cross-over conductor formed over the substrate. The cross-over conductor comprises a cured, solid conductive material that has a topography of peaks and valleys. An optically active layer is disposed on the first conductive layer and the cross-over conductor. The optically active layer includes electrooptical material dispersed in a polymeric matrix. A second conductive layer of electrically conductive material is disposed on the optically active layer in the display area and in the cross-over region. The valleys of the cross-over conductor receive the electrooptical material, and the peaks are in electrical contact with the second conductive layer.

In all embodiments of the invention the display may include only a single substrate with or without an uppermost polymeric protective layer, or it may include two or more substrates. A substrate as defined herein is a structure that supports components of an electrooptical (e.g., liquid crystal) display including an electrooptical layer that is electrically addressed to produce images. The substrate need not be rigid but can be flexible or drapable as disclosed in U.S. Pat. No. 7,236,151, which is incorporated herein by reference in its entirety. Glass, metal, polymer, paper and fabric or textile can all be used as substrate materials. The substrate is a generally thin layer, but is often significantly thicker than other components of the display. As defined herein a substrate is a layer that has a thickness of at least 10 microns and, in particular, at least 20 microns or at least 50 microns. Substrates of liquid crystal displays on the market today can have a thickness of 100 microns or more and substrates such as fabrics can be substantially thicker exceeding 1000 microns. The substrate can be formed of or have various components attached to it such as electrodes, an active matrix backplane, solar cell, photovoltaic device and the like. It will be appreciated that in all embodiments of the invention at least one of the electrically conductive layers of the display is transparent and at least one of the substrates is transparent. Terms such as bottom, top, under, over and the like used herein are only used to improve understanding and should not limit the invention.

A first embodiment of the invention features an electrooptical display with electrical cross-over, for example, in the case of a liquid crystal display with unpatterned electrically conductive layers. A substrate has a display area of overlapping conductive layers, a cross-over region designated for electrical cross-over and a bonding area for bonding display electronics to the electrically conductive layers. A first conductive layer of electrically conductive material is disposed on the substrate in the display area and in the bonding area. An electrical cross-over member is disposed in the bonding area and in the cross-over region and comprises an insulating layer of electrically insulating material disposed on the first conductive layer and a cross-over conductor disposed on the insulating layer. The cross-over conductor comprises a cured, solid conductive material that has a topography of peaks and valleys. An optically active layer is disposed on the first conductive layer and the cross-over conductor. The optically active layer includes: electrooptical material dispersed in a polymeric matrix, and nonconductive spacers. A second conductive layer of electrically conductive material is disposed on the optically active layer in the display area and in the cross-over region. The valleys of the cross-over conductor receive the electrooptical material and the spacers. The peaks are in electrical contact with the second conductive layer.

A second embodiment features an electrooptical display with electrical cross-over having patterned electrically conductive layers. A substrate has a display area including parallel row electrodes and parallel column electrodes. The row electrodes are spaced apart from and orthogonal to the column electrodes. The display can also have directly driven segments in place of the row and column electrodes and in this case the bonding area will be the same. The substrate includes a cross-over region designated for electrical cross-over and a bonding area for bonding display electronics to the row electrodes and the column electrodes. A first conductive layer includes a plurality of spaced apart traces of electrically conductive material disposed in the bonding area on the substrate and leading to the row electrodes or the column electrodes. An electrical cross-over member is disposed in the bonding area and in the cross-over region on the substrate and comprises a second conductive layer including a plurality of spaced apart traces of electrically conductive material and a cross-over conductor disposed in electrical contact on the traces of the second conductive layer. The cross-over conductor comprises a cured, solid conductive material that has a topography of peaks and valleys. An optically active layer is disposed on the first conductive layer and the cross-over conductor. The optically active layer includes electrooptical material dispersed in a polymeric matrix. A third conductive layer includes a plurality of spaced apart traces of electrically conductive material disposed on the optically active layer and extends from the cross-over region to the other of the row electrodes or the column electrodes. The valleys of the cross-over conductor receive the electrooptical material, and the peaks are in electrical contact with the third conductive layer. The traces of the third conductive layer are in alignment with the traces of the second conductive layer in the cross-over region.

Referring to specific aspects of the first and second embodiments, the display can further comprise a protective layer of material disposed on the second conductive layer or on the third conductive layer, for example, forming an outer layer of the display. The protective layer can form a second substrate and it, along with the first substrate, can be formed of polymeric material. At least one of the substrate and the protective layer is transparent and at least one of the first, second and third conductive layers is transparent.

The electrooptical material can be a liquid crystal material. One suitable liquid crystal material is bistable cholesteric liquid crystal material. Other possible liquid crystal materials are smectic or nematic. The liquid crystal material can be a polymer stabilized cholesteric texture or a polymer dispersed liquid crystal. The electrooptical material can be an electrophoretic material or an electrowetting material.

The cross-over conductor can have a roughness between 1 and 200 μm Ra, more particularly, between 2 and 12 microns Ra.

The electrical cross-over member can comprise a second cross-over conductor having a flat surface that contacts the second or the third conductive member so that the topology of the second cross-over conductor engages the topology of the first cross-over conductor. This prevents burnout of the electrically conductive material due to application of voltage at point contacts of the peaks of the cross-over conductor with the electrically conductive layer.

Another embodiment of the invention is a method of making an electrical cross-over in an electrooptical display. A substrate is provided having a display area of overlapping conductive layers, a cross-over region designated for electrical cross-over and a bonding area for bonding display electronics to the electrically conductive layers. A first conductive layer of electrically conductive material is formed on the substrate in the display area and in the bonding area. An electrical cross-over member is formed in the bonding area and in the cross-over region by applying an insulating layer of electrically insulating material on the first conductive layer and a conductive material that has a topography of peaks and valley on the insulating layer. The conductive material that has the topography of peaks and valleys is cured into a solid to form the cross-over member. A fluid optically active layer is applied on the first conductive layer and the cross-over conductor. The optically active layer includes: electrooptical material dispersed in a polymeric matrix, and nonconductive spacers. The fluid electrooptical material and the spacers are filled into the valleys of the cross-over conductor. A second conductive layer of electrically conductive material is applied on the optically active layer in the display area and in the cross-over region so that the peaks of the cross-over conductor are in electrical contact with the second conductive layer. Lastly, the polymer of the electrooptical layer is cured so as to harden.

Yet another embodiment features a method of making an electrical cross-over in an electrooptical display having patterned electrically conductive layers. A substrate is provided having a display area including parallel row electrodes and parallel column electrodes (or directly driven segments). The row electrodes are spaced apart from and orthogonal to the column electrodes. The substrate includes a cross-over region designated for electrical cross-over and a bonding area for bonding display electronics to the row electrodes and the column electrodes. A first conductive layer includes a plurality of spaced apart traces of electrically conductive material disposed in the bonding area on the substrate and leading to the row electrodes or the column electrodes. An electrical cross-over member is applied in the bonding area and in the cross-over region on the substrate comprising applying to the substrate a second conductive layer including a plurality of spaced apart traces of electrically conductive material and applying a conductive material that has a topography of peaks and valleys in electrical contact on the traces of the second conductive layer. The conductive material that has the topography of peaks and valleys is cured into a solid to form the cross-over conductor. A fluid optically active layer is applied on the first conductive layer and on the cross-over conductor. The optically active layer includes electrooptical material dispersed in a polymeric matrix. The fluid optically active material is filled into the valleys of the cross-over conductor. A third conductive layer including a plurality of spaced apart traces of electrically conductive material is applied on the optically active layer such that the peaks of the cross-over conductor are in electrical contact with the third conductive layer. The traces of the third conductive layer are aligned with the traces of the second conductive layer in the cross-over region. The third conductive layer extends from the cross-over region to the other of the row electrodes or the column electrodes. Lastly, the polymer of the optically active layer is cured so as to harden.

Many additional features, advantages and a fuller understanding of the invention will be had from the accompanying drawings and the detailed description that follows. It should be understood that the above Technical Disclosure describes the invention in broad terms while the following Detailed Description describes the invention more narrowly and presents specific embodiments that should not be construed as necessary limitations of the invention as broadly defined in the claims.

BRIEF DESCRIPTION OF THE DRAWINGS

FIG. 5 is a top plan view of the display of FIGS. 2A and 2B showing how a flexible conductive member is electrically connected to the electrically conductive material on one of the ledges and to the electrical cross-over member on the other ledge;

FIG. 6 is a cross-sectional view as seen along the cutting plane defined by the lines and arrows 6-6 in FIG. 5;

The figures are not drawn to scale.

DETAILED DESCRIPTION

Figure 1A:
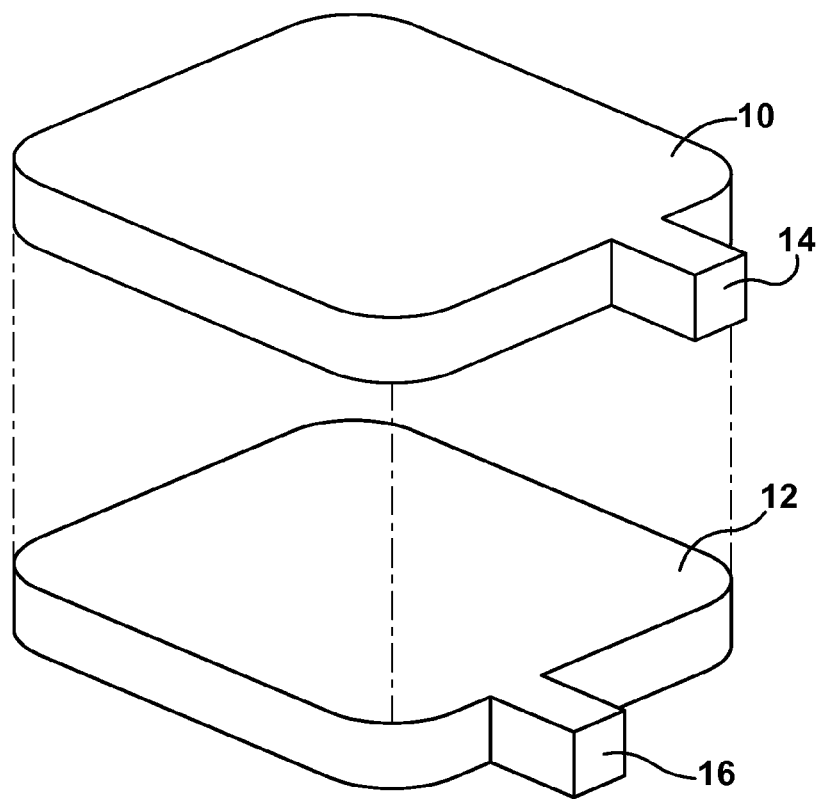
FIGS. 1A and 1B show a typical liquid crystal display with a ledge on each substrate to interconnect to a flexible connector.
Figure 1B:
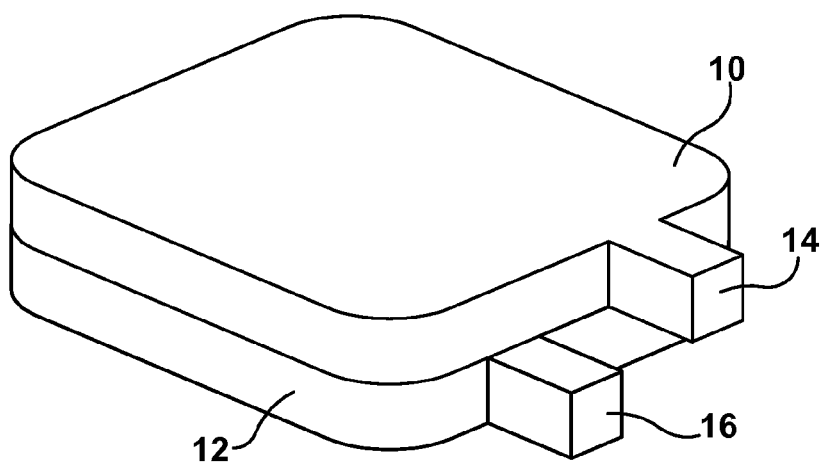

FIGS. 1A and 1B (Prior Art) illustrate a typical plastic liquid crystal display with unpatterned electrically conductive layers (not shown). There are two substrates each with a conductive layer formed on them. The conductive layers are separated by a thin liquid crystal layer (not shown). The top substrate 10 and the bottom substrate 12 each have a small section of substrate or ledge 14, 16 that is exposed and protrudes from the display for the purpose of electrical connection to the display. The electrically conductive layers are on each of the ledges. The top substrate 10 has the conductive layer facing down, while the bottom substrate 12 has the conductive layer facing up. Once the display 18 is assembled each substrate has its ledge exposed and protruding from the display. A display assembled in this fashion requires an interconnect facing down for the bottom substrate 12 and an interconnect facing up for the top substrate 10 or a single flex containing a via.

Figure 2A:
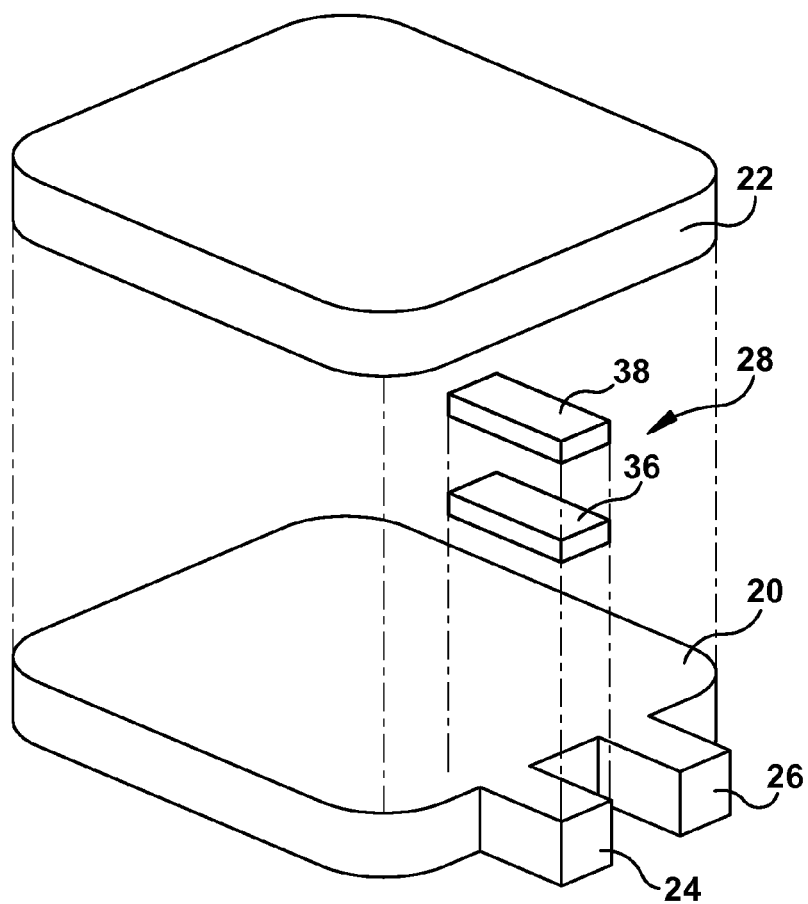
FIGS. 2A and 2B show the inventive technique of electrically connecting to a display by attaching to only one substrate.
Figure 2B:
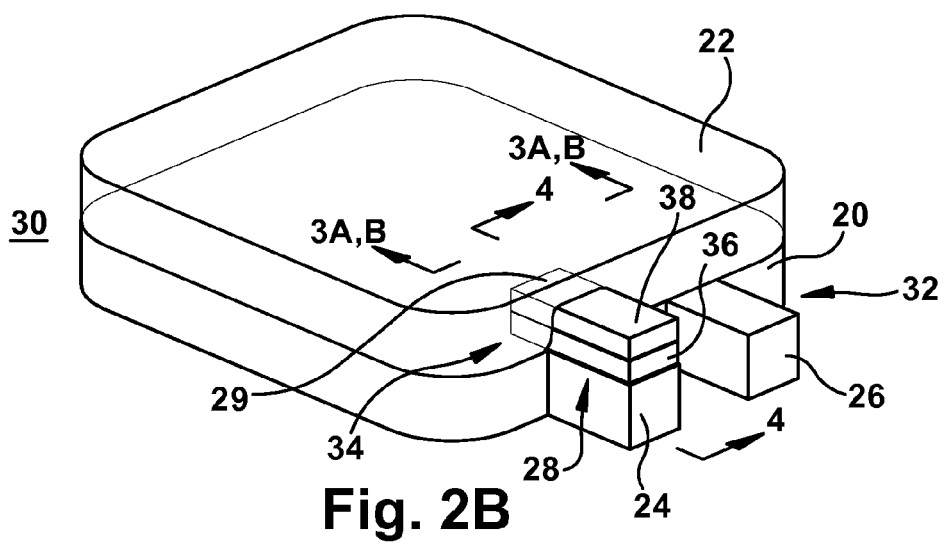

FIGS. 2A and 2B illustrate a plastic display with unpatterned electrically conductive layers and with the inventive technique of electrically connecting to the electrically conductive layer of only one substrate 20. There are two substrates each formed with a conductive layer. The conductive layers are separated by a thin liquid crystal layer. The top substrate 22 has no exposed section or ledge that protrudes from the display. The bottom substrate 20 has two small sections or ledges 24, 26 exposed that protrude from the display for the purpose of electrical connection to the display. The bottom substrate 20 also has the electric cross-over member 28 that electrically connects to the top substrate. The top substrate 22 has the conductive layer facing down, while the bottom substrate 20 has the conductive layer facing up. Once the display 30 is assembled only the bottom substrate has two ledges exposed that protrude from the display, where one is for electrical connection 32 to the bottom substrate and the other is for electrical connection 34 to the top substrate.

Both a dielectric, electrically insulating layer 36 and an electrically conductive cross-over conductor layer 38 make up the electrical cross over member 28. The dielectric and electrically conductive material are coated on the substrate 20 and have a ledge 24 under the coating to create the cross over.

Figure 3A:
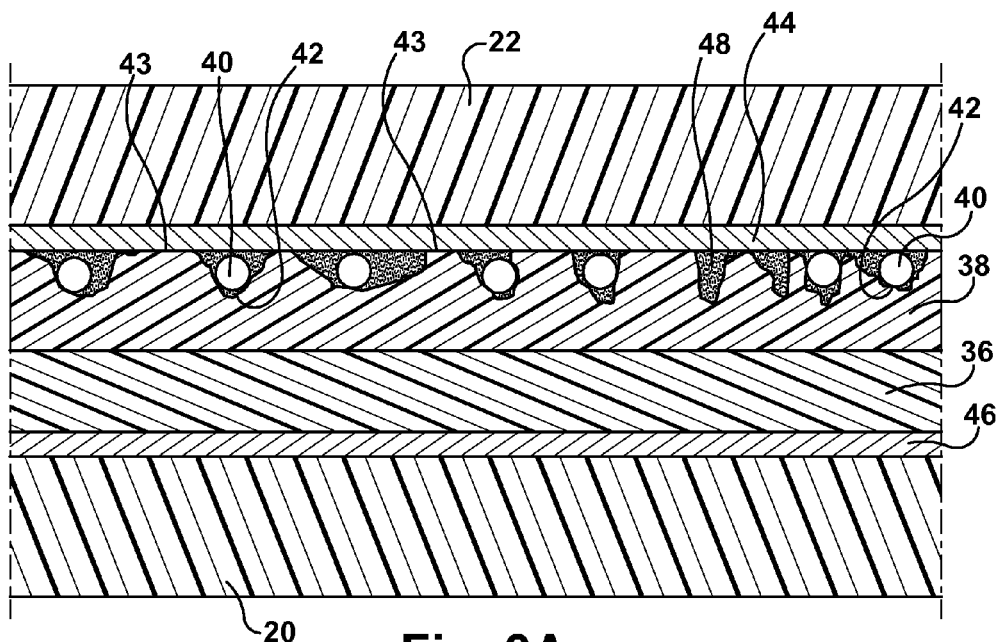
FIG. 3 shows a cross-sectional view as seen along the cutting plane defined by the lines and arrows 3A-3A in FIG. 2B indicating how a roughness of a cross-over conductive layer that is part of the electrical cross over allows connection to the electrically conductive layer of the top substrate.
FIG. 3B shows a cross-sectional view as seen along the cutting plane defined by the lines and arrows 3B-3B in FIG. 2B indicating the position of a second upper cross-over conductor.

FIG. 3A illustrates a close-up of the electrical cross over member 28. The cross-over conductor 38 allows spacers 40 used in the display to fall into valleys 42 created by the rough surface. Since the spacers 40 are trapped in valleys that are deeper than the diameter of the spacers a top electrically conductive layer 44 comes in electrical contact with peaks 43 of the cross-over conductor 38. The top electrically conductive layer 44 is coated on the top substrate 22 and a bottom electrically conductive layer 46 is coated over the bottom substrate 20. In all embodiments of the invention, techniques for applying the electrically conductive layers and the liquid crystal layer (e.g., coating and printing techniques) include those disclosed in U.S. Pat. No. 7,170,481, which is incorporated herein by reference in its entirety.

Figure 3B:
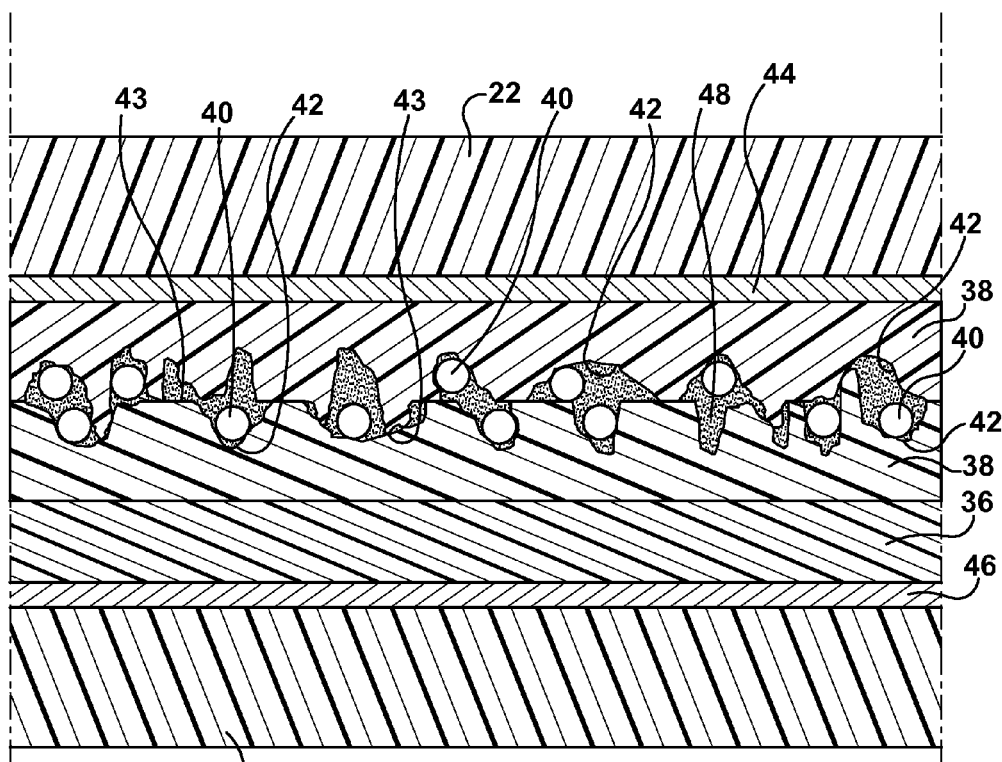

FIG. 3B illustrates a variation of the electrical cross-over member 28. The cross-over member 28 includes another upper cross-over conductor 38 but inverted from its orientation in FIG. 3A so that its flat upper surface is in electrical contact with the upper electrically conductive member 44 and its lower surface contacts the upper surface of the other cross-over conductor 38. Peaks of the upper cross-over conductor can engage valleys of the lower cross-over conductor and vice versa. Liquid crystal material and spacers are present in the valleys of the upper cross-over conductor. This prevents burn-out of the electrically conductive material due otherwise to application of voltage at point contacts of the peaks of the cross-over conductor with the electrically conductive layer. The upper surface of the upper cross-over conductor engages the upper electrically conductive layer 44 as a flat surface. This same use of a second cross-over conductor can be used in the second embodiment shown in FIG. 10 except that the upper flat surface of the upper cross-over conductor would electrically contact the third electrically conductive layer.

Figure 4:
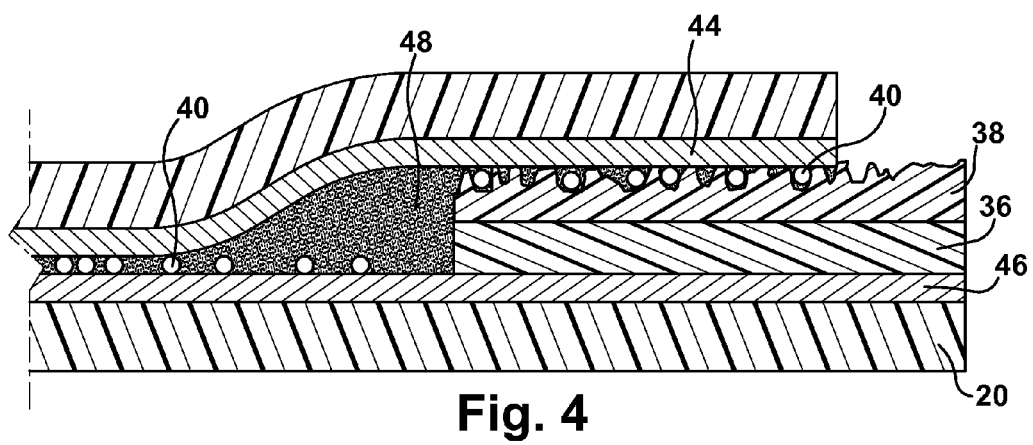
FIG. 4 shows a cross-sectional side view as seen along the cutting plane as defined by the lines and arrows 4-4 of FIG. 2B revealing that the electrical cross over has two layers: a dielectric layer and a conductive layer.
Figure 4A:
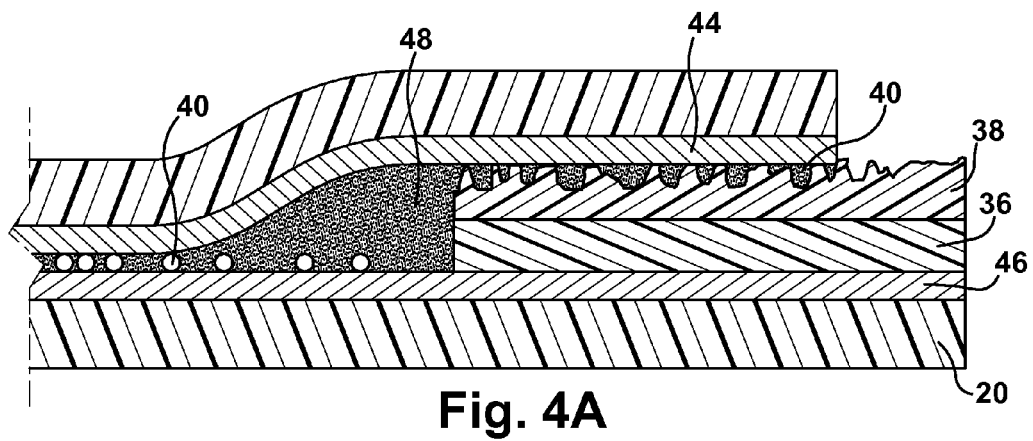

FIG. 4 illustrates a side cross-sectional view of the electrical crossover member 28. The dielectric layer 36 prevents the top and bottom substrates from shorting together. Next to the dielectric layer 36 and the cross-over conductor 38 is the electrooptical material (e.g., liquid crystal material) 48. All of the electrooptical material of this disclosure has the same characteristics and is dispersed in a polymeric matrix. A suitable display is an electrooptical material forming a bistable display. Examples of liquid crystal materials are cholesteric, nematic and smectic. A specific display suitable for use in the present invention is a bistable cholesteric liquid crystal display. As will be apparent to those of ordinary skill in the art in view of the instant disclosure, the liquid crystal material will preferably be present in the displays of the invention in the form of liquid crystalline layers comprised of a liquid crystal dispersion and, most preferably, a cholesteric droplet dispersion. There are many different approaches to the formation of a layer of liquid crystal droplets, some of which have been used for cholesteric liquid crystals. To form such a liquid crystal layer, the liquid crystal can be microencapsulated, formed into a layer of phase separated liquid crystal droplets, or formed into emulsified droplets of liquid crystal. More specifically, one process suitable for forming liquid crystal layers for use in the invention is phase separation, which is basically a process that involves mixing the cholesteric liquid crystalline material with a pre-polymer solution then polymerizing the polymer under suitable conditions to form a dispersion of droplets in a polymer binder. Polymerization and, hence, droplet formation, occurs after the material mixture has been coated onto the display. There are basically three types of polymerization techniques that can be used depending on the polymer (or monomer): (1) thermally induced phase separation (TIPS); (2) polymerization induced phase separation (PIPS); and, (3) solvent induced phase separation (SIPS), for example as disclosed in U.S. Pat. No. 7,170,481. A bistable display is one having at least two states that are stable in an absence of an electric field. Examples of other electrooptical materials that can be used in an electrooptical display instead of liquid crystal material are electrophoretic or electrowetting materials. In FIG. 4, notice that the section of bottom substrate 20 that is exposed and protrudes from the display 30 for electrical connection to the top substrate 22 is also shown.

A display area of the display 30 is located where the upper and lower electrically conductive layers 44, 46 overlap having the electrooptical material 48 disposed between them. A bonding area is where the bottom electrically conductive layer 46 protrudes from the upper substrate 22 on ledge 26 and where the cross-over conductor 38 protrudes from the upper substrate on ledge 24. A cross-over region 29 is where the cross-over member 28 extends under the conductive layer, coated top substrate 22.

FIGS. 5 and 6 illustrate how the display's conductive ledges 24, 26 connect to a flexible electronic conductor ("flex") 50. The flex has conductive pads 52 that are connected to the display's conductive ledges using a conductive adhesive or anisotropic conductive film 53. The conductive pads face toward the display away from the viewer in this figure. The conductive pads have conductive traces 54 that connect to them on the flex 50, allowing electrical connection to the display through the end of the flex. The flex 50 is made up of conductive pads 52, conductive traces 54, and a flexible plastic film 56. Once the display is connected to the flex, the flex can be connected to a PCB containing LCD driver chips through the traces on the flex. Other ways of bonding display electronics to the electrical traces in the bonding areas are encompassed by this invention and would be apparent to those skilled in the art in view of this disclosure. Top substrate 10 is transparent as are the traces used on the top and bottom substrate. The traces can be formed of transparent conductive material such as conductive polymer, carbon nanotubes or indium tin oxide (ITO).

Figure 7:
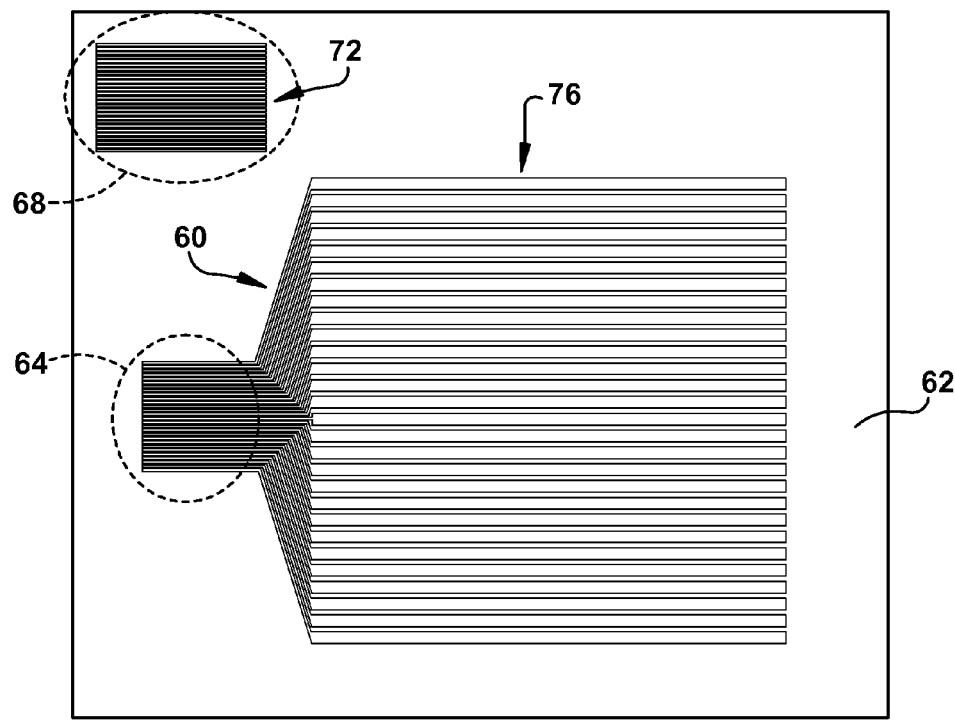
FIG. 7 is a top plan view of electrical traces and, for example, row electrodes formed on a bottom substrate along with electrical traces of a component of an electrical cross-over member.

Referring to a second embodiment of the invention, FIG. 7 illustrates the patterned conductive traces 60 formed on a top surface of a bottom substrate 62 of a patterned display that uses this invention. This substrate 62 is electrically connected to the circled trace region at 64. The opposite top substrate 66 (FIG. 8) is electrically connected to the patterned conductive traces in the circled region 68.

Figure 8:
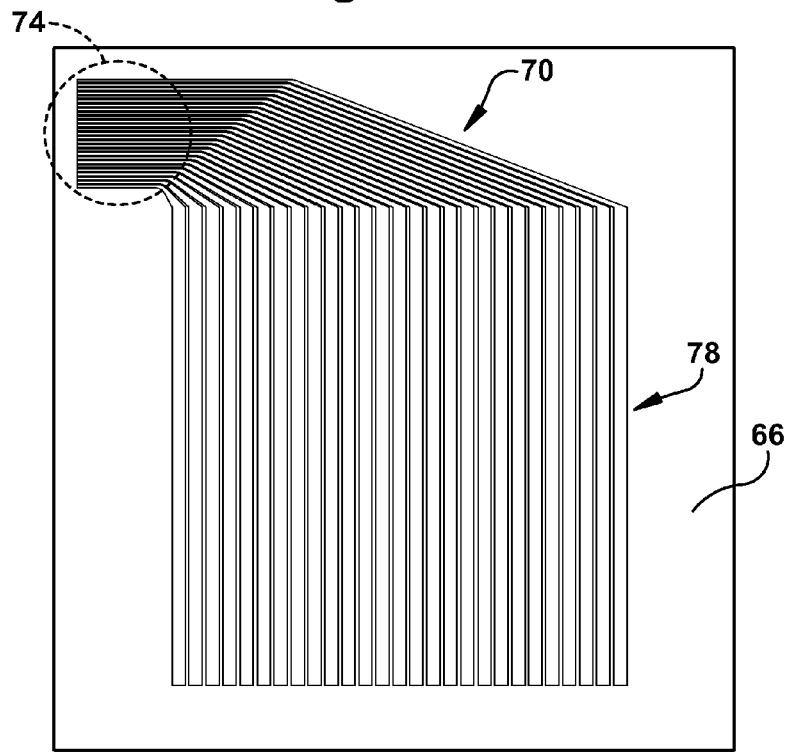
FIG. 8 is a top plan view of electrical traces and, for example, column electrodes formed on a top substrate.

FIG. 8 illustrates patterned conductive traces 70 formed on a bottom surface of the top substrate of a patterned display that uses this invention. Top substrate 66 is transparent as are the traces used on the top and bottom substrate. The traces can be formed of transparent conductive material such as conductive polymer, carbon nanotubes or indium tin oxide (ITO). The upper substrate 66 is electrically connected to the traces on the bottom substrate at 68 (FIG. 7). Conductive traces 72 on the bottom substrate 62 electrically connect in the z direction (in and out of the paper in the top views) to the patterned conductive traces of the top substrate shown in the circled region 74. A layer of liquid crystal material is disposed between the layers of conductive traces formed on the bottom and top substrates, but is confined to the region bounded by the top substrate (FIG. 8).

Row electrodes 76, for example, are formed by the conductive traces 60 on the bottom substrate 62 while column electrodes 78, for example, are formed by the conductive traces 70 on the top substrate 66.

Figure 9:
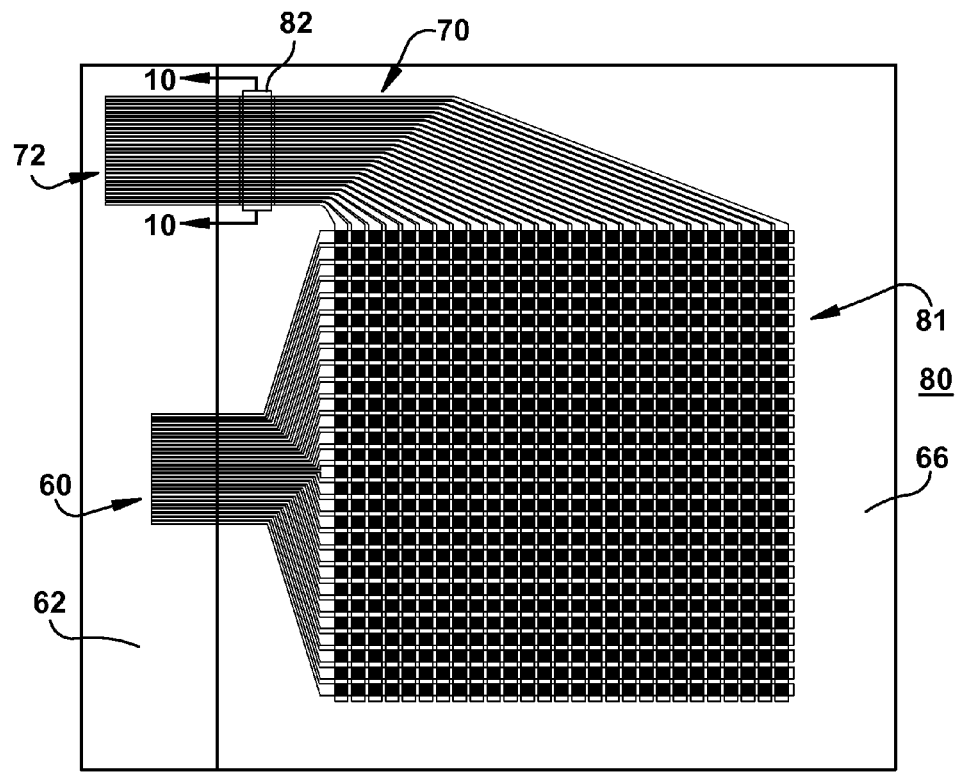
FIG. 9 is a top plan view of the top substrate of FIG. 8 overlaying the bottom substrate of FIG. 7.

FIG. 9 illustrates the top and bottom substrates overlayed forming a patterned display 80. The region of crossing row and column electrodes is the display area 81. The region to the left of the top substrate comprised of only the bottom substrate is the bonding area (i.e., regions 68 and 64). The region shown at 82 is a portion of a cross-over region having an electrical connection between electrically conductive layers formed on the top and bottom substrates in the z direction with the traces 72 from the bottom substrate in region 68 and traces 70 from the top substrate 66 in the region 74.

Figure 10:
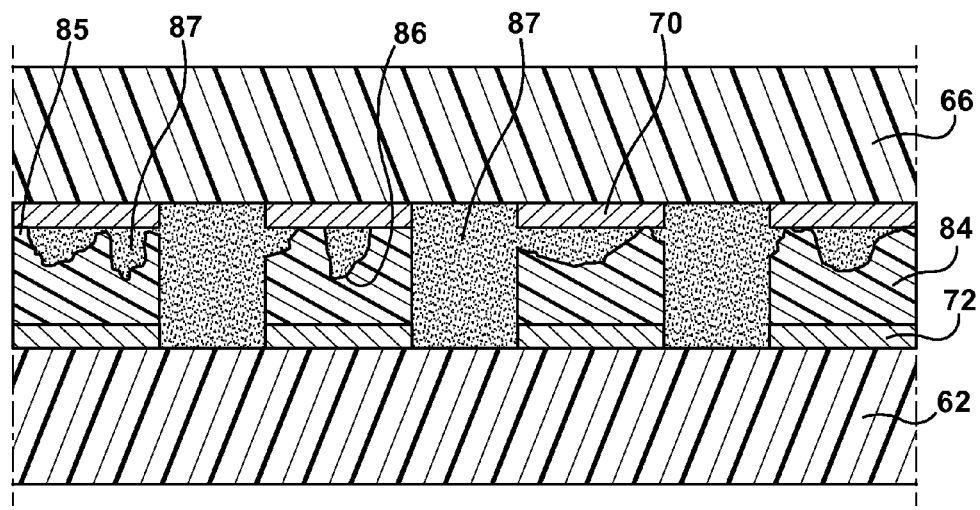
FIG. 10 is a cross-sectional view as seen along the cutting plane defined by the lines and arrows 10-10 in FIG. 9.

As shown in FIG. 10, the patterned conductive traces 72 for the bottom substrate 62 are shown electrically connected to the patterned conductive traces 70 on the top substrate 66 in regions 68 and 74 through a patterned cross-over conductor 84 with a roughened top surface that forms a topography of peaks 85 and valleys 86. This figure shows how liquid crystal 87 surrounds the patterned conductive traces 72, 70 and fills in the valleys 86 of the cross-over conductor. Notice that a dielectric layer is not required for the patterned conductor display. The bonding areas 68, 64 of the display 80 can be connected to flex as in the case of the unpatterned display of the first embodiment (FIGS. 2A and 2B), and the flex can be connected to a PCB containing LCD driver chips through the traces of the flex. Other ways of bonding display electronics to the electrical traces in the bonding areas are encompassed by this invention and would be apparent to those skilled in the art in view of this disclosure.

The invention will now be described with regard to the following example which should not be interpreted so as to limit the invention.

EXAMPLE

A flexible plastic LCD was constructed using a crossover member to electrically connect the top substrate to a trace on the bottom substrate. A UV-curable dielectric material (DuPont 5018) was screen printed onto a 2 mil PET substrate gravure coated with Agfa S300 PEDOT mixed with 0.15% Silquest A-187 silane by volume. The print was executed by traversing an 80-durometer rectangular squeegee positioned at 45° over a 105 mesh stainless steel screen. The dielectric print was cured under an Electro-Lite UV lamp without the manufacturer's filter in place at 8.0 mW/cm$^2$ for two minutes. A conductive carbon paste (DuPont 7102) was used to screen print a trace on top of the cured dielectric layer in the same manner using a 195 mesh polyester screen. The carbon trace was cured in an oven for five minutes at a temperature of 130 C. Upon curing, no conductivity was measured between the carbon trace and the PEDOT beneath the dielectric layer.

The display was made using a second 2 mil PET substrate gravure coated with Agfa S300 PEDOT mixed with 0.15% Silquest A-187 silane by volume. A PIPS mixture of liquid crystal with 4.0 μm spacers mixed in (2.5% by volume) was laminated between the two substrates. The PIPS mixture of liquid crystal was applied as a fluid onto the lower electrically conductive layer and the carbon trace and then when the electrically conductive coated upper substrate was laminated onto it the liquid crystal and spacers flowed inside valleys of the carbon trace. Alternatively, the PIPS mixture of liquid crystal fluid could be applied to the electrically conductive coated upper substrate. The top substrate was laminated so it covered only part of the carbon trace, leaving the rest exposed for switching purposes. A second trace was left exposed on the bottom substrate that had only PEDOT on it. The display was cured under an Electro-Lite UV lamp at an intensity of 0.92 mW/cm$^2$ for 20 minutes. Both traces were painted with conductive silver paint and a pulse of 40V, 30 ms, 33 Hz was applied to the exposed silver paint over the conductive carbon paste (top substrate electrically conductive layer) and to the exposed silver paint over the electrically conductive layer (bottom substrate electrically conductive layer).

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. An electrooptical display with electrical cross-over comprising:
    a substrate having a display area of overlapping conductive layers, a cross-over region designated for electrical cross-over and a bonding area for bonding display electronics to said conductive layers;
    a first said conductive layer of electrically conductive material disposed on said substrate in said display area and in said bonding area;
    an electrical cross-over member disposed in said bonding area and in said cross-over region and comprising a cross-over conductor formed over said substrate, said cross-over conductor comprising a cured, solid conductive material that has a topography of peaks and valleys;
    an optically active layer disposed on said first conductive layer and said cross-over conductor, said optically active layer including electrooptical material dispersed in a polymeric matrix; and
    a second said conductive layer of electrically conductive material disposed on said optically active layer in said display area and in said cross-over region;
    wherein said valleys of said cross-over conductor receive said electrooptical material, and said peaks are in electrical contact with said second conductive layer.

2. The electrooptical display of claim 1 further comprising a protective layer of material disposed on said second conductive layer.

3. The electrooptical display of claim 1 wherein said first and second conductive layers are unpatterned or patterned.

4. The electrooptical display of claim 1 wherein said substrate is formed of polymeric material.

5. The electrooptical display of claim 2 wherein said protective layer is a second substrate.

6. The electrooptical display of claim 5 wherein said second substrate is formed of polymeric material.

7. The electrooptical display of claim 2 wherein at least one of said substrate and said protective layer is transparent and at least one of said first and second conductive layers is transparent.

8. The electrooptical display of claim 1 wherein said electrooptical material is a liquid crystal material.

9. The electrooptical display of claim 8 wherein said liquid crystal material is bistable cholesteric liquid crystal material.

10. The electrooptical display of claim 8 wherein said liquid crystal material is smectic or nematic.

11. The electrooptical display of claim 8 wherein said liquid crystal material is a polymer stabilized cholesteric texture or a polymer dispersed liquid crystal.

12. The electrooptical display of claim 1 wherein said electrooptical material is an electrophoretic material or an electrowetting material.

13. The electrooptical display of claim 1 wherein said cross-over conductor has a roughness between 1 and 200 μm.

14. The electrooptical display of claim 1 wherein said cross-over conductor has a roughness of between 2 and 12 microns.

15. An electrooptical display with electrical cross-over comprising:
    a substrate having a display area of overlapping conductive layers, a cross-over region designated for electrical cross-over and a bonding area for bonding display electronics to said conductive layers;
    a first said conductive layer of electrically conductive material disposed on said substrate in said display area and in said bonding area;
    an electrical cross-over member disposed in said bonding area and in said cross-over region and comprising an insulating layer of electrically insulating material disposed on said first conductive layer and a cross-over conductor disposed on said insulating layer, said cross-over conductor comprising a cured, solid conductive material that has a topography of peaks and valleys;
    an optically active layer disposed on said first conductive layer and said cross-over conductor, said optically active layer including: electrooptical material dispersed in a polymeric matrix, and nonconductive spacers; and
    a second said conductive layer of electrically conductive material disposed on said optically active layer in said display area and in said cross-over region;
    wherein said valleys of said cross-over conductor receive said electrooptical material and said spacers, and said peaks are in electrical contact with said second conductive layer.

16. The electrooptical display of claim 15 wherein said electrical cross-over member comprises a second said cross-over conductor having a flat surface that contacts said second conductive member and has a topography of peaks and valleys so that said topography of said second cross-over conductor engages said topography of said cross-over conductor.

17. The electrooptical display of claim 15 further comprising a second substrate disposed on said second conductive layer.

18. An electrooptical display with electrical cross-over comprising:
    a substrate having a display area including parallel row electrodes and parallel column electrodes, said row electrodes being spaced apart from and orthogonal to said column electrodes; said substrate including a cross-over region designated for electrical cross-over and a bonding area for bonding display electronics to said row electrodes and said column electrodes;

a first conductive layer including a plurality of spaced apart traces of electrically conductive material disposed in said bonding area on said substrate and leading to said row electrodes or said column electrodes;

an electrical cross-over member disposed in said bonding area and in said cross-over region on said substrate and comprising a second conductive layer including a plurality of spaced apart traces of electrically conductive material and a cross-over conductor disposed in electrical contact on said traces of said second conductive layer, said cross-over conductor comprising a cured, solid conductive material that has a topography of peaks and valleys;

an optically active layer disposed on said first conductive layer and said cross-over conductor, said optically active layer including electrooptical material dispersed in a polymeric matrix; and a third conductive layer including a plurality of spaced apart traces of electrically conductive material disposed on said optically active layer and extending from said cross-over region to the other of said row electrodes or said column electrodes;

wherein said valleys of said cross-over conductor receive said electrooptical material, and said peaks are in electrical contact with said third conductive layer, said traces of said third conductive layer being in alignment with said traces of said second conductive layer in said cross-over region.

19. The electrooptical display of claim 18 wherein said electrical cross-over member comprises a second said cross-over conductor having a flat surface that contacts said third conductive member and has a topography of peaks and valleys so that said topography of said second cross-over conductor engages said topography of said cross-over conductor.

20. The electrooptical display of claim 18 further comprising a second substrate disposed on said third conductive layer.

21. A method of making an electrical cross-over in an electrooptical display comprising:

providing a substrate having a display area including overlapping conductive layers, a cross-over region designated for electrical cross-over and a bonding area for bonding display electronics to said electrically conductive layers;

forming a first said conductive layer of electrically conductive material on said substrate in said display area and in said bonding area;

forming an electrical cross-over member in said bonding area and in said cross-over region by applying an insulating layer of electrically insulating material on said first conductive layer and a conductive material that has a topography of peaks and valley on said insulating layer;

curing into a solid said conductive material that has said topography of peaks and valleys to form said cross-over member;

applying a fluid optically active layer on said first conductive layer and said cross-over conductor in said display area and in said cross-over region, said optically active layer including:

electrooptical material dispersed in a polymeric matrix, and nonconductive spacers;

filling said fluid electrooptical material and said spacers into said valleys of said cross-over conductor;

applying a second said second conductive layer of electrically conductive material on said optically active layer in said display area so that said peaks of said cross-over conductor are in electrical contact with said second conductive layer; and curing said polymer of said electrooptical layer.

22. A method of making an electrical cross-over in an electrooptical display comprising:

providing a substrate having a display area including parallel row electrodes and parallel column electrodes, said row electrodes being spaced apart from and orthogonal to said column electrodes; said substrate including a cross-over region designated for electrical cross-over and a bonding area for bonding display electronics to said row electrodes and said column electrodes;

applying a first conductive layer including a plurality of spaced apart traces of electrically conductive material disposed in said bonding area on said substrate and leading to said row electrodes or said column electrodes;

applying an electrical cross-over member in said bonding area and in said cross-over region on said substrate comprising applying to said substrate a second conductive layer including a plurality of spaced apart traces of electrically conductive material and applying a conductive material that has a topography of peaks and valleys in electrical contact on said traces of said second conductive layer;

curing into a solid said conductive material that has said topography of peaks and valleys to form said cross-over conductor;

applying a fluid optically active layer on said first conductive layer and on said cross-over conductor, said optically active layer including electrooptical material dispersed in a polymeric matrix;

filling said fluid optically active material into said valleys of said cross-over conductor;

applying a third conductive layer including a plurality of spaced apart traces of electrically conductive material on said optically active layer such that said peaks of said cross-over conductor are in electrical contact with said third conductive layer;

aligning said traces of said third conductive layer with said traces of said second conductive layer in said cross-over region, said third conductive layer extending from said cross-over region to the other of said row electrodes or said column electrodes; and curing said polymer of said optically active layer.

23. The electrooptical display of claim 1 wherein said first conductive layer and said second conductive layer are unpatterned, said electrooptical material includes nonconductive spacers, and said cross-over member comprises an insulating layer of electrically insulating material disposed on said first conductive layer and said cross-over conductor is disposed on said insulating layer.

24. The electrooptical display of claim 1 wherein said first conductive layer and said second conductive layer are patterned, there is no insulating layer in contact with said cross-over conductor, said electrooptical material includes nonconductive spacers, and another conductive layer is disposed in said bonding area and in said cross-over area, said cross-over conductor being in electrical contact with said second conductive layer and said another conductive layer.

25. The electrooptical display of claim 18 wherein said electrooptical material includes nonconductive spacers.

26. The electrooptical display of claim 25 wherein said valleys of said cross-over conductor receive said spacers.

27. The electrooptical display of claim 25 wherein there is no insulating layer in contact with said cross-over conductor.

28. The method of claim 22 wherein said electrooptical material includes nonconductive spacers.

29. The method of claim 28 wherein said valleys of said cross-over conductor receive said spacers.

* * * * *